(12) United States Patent
Lee et al.

(10) Patent No.: US 11,568,837 B2
(45) Date of Patent: Jan. 31, 2023

(54) DISPLAY DEVICE AND METHOD OF OPERATING DISPLAY PANEL FOR DISPLAYING AN IMAGE OF A SURROUNDING PERIPHERAL DISPLAY REGION BASED ON LUMINANCE DEVIATION

(71) Applicant: Samsung Display Co., Ltd., Yongin-si (KR)

(72) Inventors: Sukhun Lee, Suwon-si (KR); Bon-Seog Gu, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/411,000

(22) Filed: Aug. 24, 2021

(65) Prior Publication Data
US 2022/0108669 A1 Apr. 7, 2022

(30) Foreign Application Priority Data
Oct. 5, 2020 (KR) .................. 10-2020-0128356

(51) Int. Cl.
*G09G 5/373* (2006.01)
*G06T 7/10* (2017.01)

(52) U.S. Cl.
CPC .............. *G09G 5/373* (2013.01); *G06T 7/10* (2017.01); *G06T 2207/20021* (2013.01); *G06T 2207/20132* (2013.01); *G09G 2340/0407* (2013.01); *G09G 2360/16* (2013.01)

(58) Field of Classification Search
None
See application file for complete search history.

(56) References Cited

U.S. PATENT DOCUMENTS

| 7,495,638 | B2 * | 2/2009 | Lamvik ............... G09G 3/3233 345/76 |
| 9,190,029 | B2 | 11/2015 | Lim et al. |
| 10,147,777 | B2 | 12/2018 | Lim et al. |
| 10,332,432 | B2 | 6/2019 | An et al. |

(Continued)

FOREIGN PATENT DOCUMENTS

| KR | 20170108182 | 9/2017 |
| KR | 20180018960 | 2/2018 |

(Continued)

*Primary Examiner* — Patrick F Valdez
(74) *Attorney, Agent, or Firm* — H.C. Park & Associates, PLC

(57) ABSTRACT

A display device includes: a display panel including a surrounding display area, below which at least one panel driving circuit is positioned, and a main display area surrounded by the surrounding display area, the display panel including first pixels having a first pixel density and disposed in the surrounding display area and second pixels having a second pixel density greater than the first pixel density and disposed in the main display area; and a display panel driver to divide an input image to be displayed on the display panel in each frame into a first image to be displayed on the surrounding display area and a second image to be displayed on the main display area, calculate a luminance deviation of the first image, and determine whether to display the first image in the surrounding display area based on the luminance deviation of the first image.

22 Claims, 10 Drawing Sheets

(56) References Cited

U.S. PATENT DOCUMENTS

| | | | |
|---|---|---|---|
| 10,586,483 B2 | 3/2020 | Park et al. | |
| 10,839,729 B2 | 11/2020 | Yoo et al. | |
| 2017/0236466 A1* | 8/2017 | Spitzer | G09G 3/2085 345/560 |
| 2017/0323619 A1* | 11/2017 | Lee | G02B 27/0101 |
| 2018/0308413 A1* | 10/2018 | Jin | G09G 3/20 |
| 2021/0174754 A1 | 6/2021 | Yang et al. | |

FOREIGN PATENT DOCUMENTS

| | | |
|---|---|---|
| KR | 20180029181 | 3/2018 |
| KR | 101926070 | 2/2019 |
| KR | 20190121104 | 10/2019 |
| KR | 20200001658 | 1/2020 |

* cited by examiner

DISPLAY DEVICE AND METHOD OF OPERATING DISPLAY PANEL FOR DISPLAYING AN IMAGE OF A SURROUNDING PERIPHERAL DISPLAY REGION BASED ON LUMINANCE DEVIATION

CROSS REFERENCE TO RELATED APPLICATION

This application claims priority from and the benefit of Korean Patent Application No. 10-2020-0128356, filed on Oct. 5, 2020, which is hereby incorporated by reference for all purposes as if fully set forth herein.

BACKGROUND

Field

Embodiments of the invention relate generally to a display device and a method of operating the display device and more specifically, to a display device having a display area at edges thereof and a method of operating the display device.

Discussion of the Background

In general, a display device may include a display panel and a display panel driver. The display panel may include pixels and display an image corresponding to input image data by using the pixels. The display panel may be connected to the display panel driver through scan lines and data lines. The display panel driver may include a scan driver that provides a scan signal to the display panel through the scan lines, data driver that provides a data voltage to the display panel through the data lines, and a timing controller that controls the scan driver and the data driver.

Meanwhile, the area occupied by driving circuits included in the display panel driver defines a bezel part in the display device, and a size of a display area for displaying an image on the display panel is limited due to the bezel part. However, since the driving circuits are essential components in the display device, it is impossible to completely remove the bezel part.

In order to improve the problem, a pixel on driver (or POD) technology expands the display area while maintaining the bezel part by adding a surrounding display area above the driving circuits. However, since the surrounding display area has a low pixels per unit inch (PPI), there is a limit in that a boundary with the main display area is visually recognized.

The above information disclosed in this Background section is only for understanding of the background of the inventive concepts, and, therefore, it may contain information that does not constitute prior art.

SUMMARY

Display devices constructed according to the principles of the invention are capable of increasing or maximizing a display area of the display devices by decreasing or minimizing a bezel area of the display devices, in which driving circuits of the display devices are disposed. The display devices constructed according to the principles of the invention include a display panel and a display panel driver. The display panel includes a surrounding display area below which at least one panel driving circuit is positioned. The display panel driver determines a display area of an image to be displayed on the display panel according to a luminance deviation of an image displayed in the surrounding display area. Accordingly, the display area of the display devices can extend. In addition, the boundary between the image displayed in the surrounding display area and the image displayed in the main display area of the display device cannot be visually recognized.

Methods of operating display devices according to the principles of the invention are capable of preventing or minimizing user's visual recognition of a boundary between a display area and a bezel area, in which driving circuits of the display devices are disposed.

Additional features of the inventive concepts will be set forth in the description which follows, and in part will be apparent from the description, or may be learned by practice of the inventive concepts.

According to an aspect of the invention, a display device includes: a display panel including a surrounding display area, below which at least one panel driving circuit is positioned, and a main display area surrounded by the surrounding display area, the display panel including first pixels having a first pixel density and disposed in the surrounding display area and second pixels having a second pixel density greater than the first pixel density and disposed in the main display area; and a display panel driver configured to divide an input image to be displayed on the display panel in each frame into a first image to be displayed on the surrounding display area and a second image to be displayed on the main display area, calculate a luminance deviation of the first image, and determine whether to display the first image in the surrounding display area based on the luminance deviation of the first image.

The display panel driver may include a data corrector for downscaling or cropping the input image by correcting input image data corresponding to the input image based on the luminance deviation of the first image.

The data corrector may be configured to correct the input image data such that the first image may not be displayed in the surrounding display area and the second image may be displayed in the main display area when the luminance deviation of the first image is greater than a reference luminance deviation.

The data corrector may be configured to correct the input image data such that the second image may be displayed in the main display area and an edge image of the second image may be expanded and displayed in the surrounding display area when the luminance deviation of the first image is greater than a reference luminance deviation.

The data corrector may be configured to additionally correct the input image data such that a luminance of the surrounding display area may be decreased as a distance from the main display area may be increased when the edge image of the second image is expanded and displayed in the surrounding display area.

The data corrector may be configured to correct the input image data such that the first image may not be displayed in the surrounding display area and the first image and the second image may be displayed in the main display area when the luminance deviation of the first image is greater than a reference luminance deviation.

The data corrector may be configured to correct the input image data such that the first image and the second image may be displayed in the main display area and an edge image of the first image may be expanded and displayed in the surrounding display area when the luminance deviation of the first image is greater than a reference luminance deviation.

The data corrector may be configured to additionally correct the input image data such that a luminance of the surrounding display area may be decreased as a distance from the main display area may be increased when the edge image of the first image is expanded and displayed in the surrounding display area.

The data corrector may be configured to correct the input image data such that the first image may be displayed in the surrounding display area, the second image may be displayed in the main display area, and a boundary between the surrounding display area and the main display area may be prevented from being visually recognized to a user when the luminance deviation of the first image is smaller than a reference luminance deviation.

The data corrector may be configured to additionally correct the input image data such that a luminance of the surrounding display area may be decreased as a distance from the main display area may be increased when the first image is displayed in the surrounding display area.

According to another aspect of the invention, a method of operating a display panel having a main display area and a surrounding display area surrounding the main display area includes the steps of: driving the display panel and dividing an input image to be displayed on the display panel in each frame into a first image to be displayed in the surrounding display area and a second image to be displayed in the main display area; calculating a luminance deviation of the first image; and determining whether to display the first image in the surrounding display area based on the luminance deviation of the first image, wherein the display panel includes at least one panel driving circuit disposed under the surrounding display area, first pixels having a first pixel density and disposed in the surrounding display area, and second pixels having a second pixel density greater than the first pixel density and disposed in the main display area.

The method may further include the step of: downscaling or cropping the input image by correcting input image data corresponding to the input image based on the luminance deviation of the first image.

The step of cropping of the input image may include the step of correcting the input image data such that the first image may not be displayed in the surrounding display area and the second image may be displayed in the main display area when the luminance deviation of the first image is greater than a reference luminance deviation.

The step of cropping of the input image may include the step of correcting the input image data such that the second image may be displayed in the main display area and an edge image of the second image may be expanded and displayed in the surrounding display area when the luminance deviation of the first image is greater than a reference luminance deviation.

The step of cropping of the input image may further include the step of correcting the input image data such that a luminance of the surrounding display area is decreased as a distance from the main display area is increased when the edge image of the second image is expanded and displayed in the surrounding display area.

The step of downscaling of the input image may include the step of correcting the input image data such that the first image may not be displayed in the surrounding display area and the first image and the second image may be displayed in the main display area when the luminance deviation of the first image is greater than a reference luminance deviation.

The step of downscaling of the input image may include the step of correcting the input image data such that the first image and the second image may be displayed in the main display area and an edge image of the first image may be expanded and displayed in the surrounding display area when the luminance deviation of the first image is greater than a reference luminance deviation.

The step of downscaling of the input image may further include the step of correcting the input image data such that a luminance of the surrounding display area may be decreased as a distance from the main display area may be increased when the edge image of the first image is expanded and displayed in the surrounding display area.

The step of correcting of the input image data may include the step of correcting the input image data such that the first image may be displayed in the surrounding display area, the second image may be displayed in the main display area, and a boundary between the surrounding display area and the main display area may be prevented from being visually recognized to a user when the luminance deviation of the first image is smaller than a reference luminance deviation.

The step of correcting of the input image data may further include the step of correcting the input image data such that a luminance of the surrounding display area may be decreased as a distance from the main display area may be increased when the first image is displayed in the surrounding display area.

According to still another aspect of the invention, the display device includes: a display panel comprising a surrounding display area, below which at least one panel driving circuit is positioned, and a main display area surrounded by the surrounding display area, the display panel comprising first pixels having a first size and disposed in the surrounding display area and second pixels having a second size smaller than the first size and disposed in the main display area; and a display panel driver configured to divide an input image to be displayed on the display panel in each frame into a first image to be displayed on the surrounding display area and a second image to be displayed on the main display area, calculate a luminance deviation of the first image, and determine whether to display the first image in the surrounding display area based on the luminance deviation of the first image.

According to still another aspect of the invention, a method of operating a display panel having a main display area and a surrounding display area surrounding the main display area includes the steps of: driving the display panel and dividing an input image to be displayed on the display panel in each frame into a first image to be displayed in the surrounding display area and a second image to be displayed in the main display area; calculating a luminance deviation of the first image; and determining whether to display the first image in the surrounding display area based on the luminance deviation of the first image, wherein the display panel comprises at least one panel driving circuit disposed under the surrounding display area, first pixels having a first size and disposed in the surrounding display area, and second pixels having a second size smaller than the first size and disposed in the main display area.

The display device according to the embodiments of the present inventive concept may include a display panel and a display panel driver. The display panel may include a surrounding display area below which at least one panel driving circuit is positioned. The display panel driver may determine a display area of an image to be displayed on the display panel according to a luminance deviation of an image displayed in the surrounding display area. Accordingly, the display area of the display device can extend. In addition, the boundary between the image displayed in the surrounding display area and the image displayed in the main display area of the display device cannot be visually recognized.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
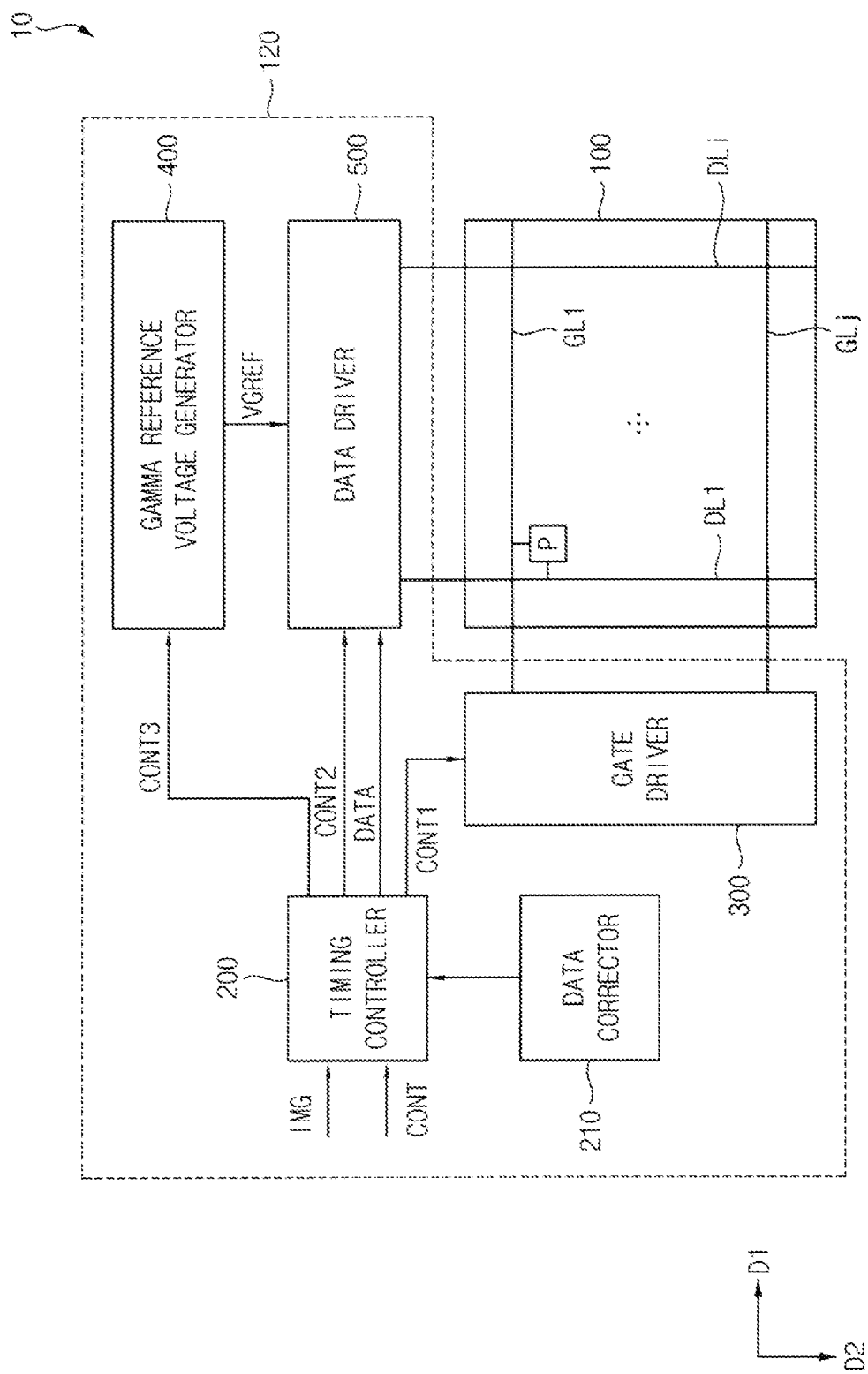
FIG. 1 is a block diagram of an embodiment of a display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, the embodiments will be described in more detail with reference to the accompanying drawings. The same reference numerals are used for the same components in the drawings, and redundant descriptions of the same components will be omitted.

Figure 2:
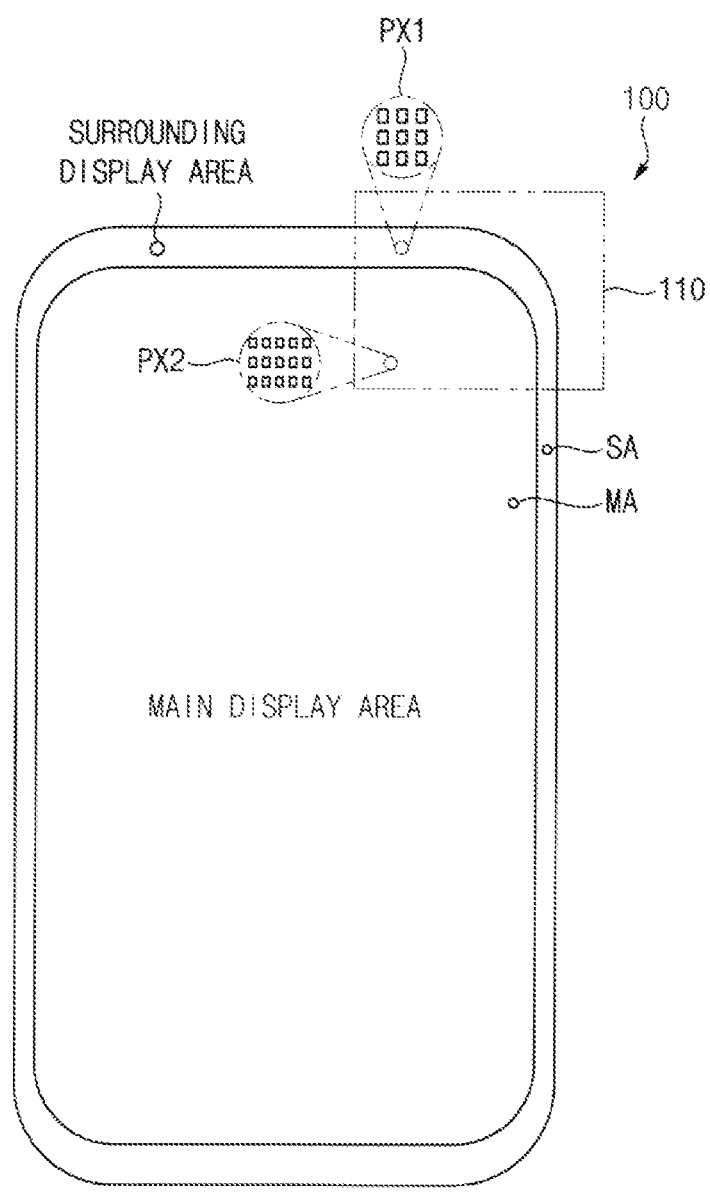
FIG. 2 is a plan view of a display panel included in the display device of FIG. 1.

FIG. 1 is a block diagram illustrating a display device according to one embodiment. FIG. 2 is a diagram illustrating an example of a display panel included in the display device of FIG. 1.

Referring to FIGS. 1 and 2, the display device 10 may include a display panel 100 and a display panel driver 120. The display panel driver 120 may include a timing controller 200, a data corrector 210, a gate driver 300, a gamma reference voltage generator 400, and a data driver 500.

The display panel 100 may include a display region for displaying an image and a peripheral region disposed adjacent to the display region.

The display panel 100 may include pixels P and display an image corresponding to input image data IMG by using the pixels P. The gate lines GL1 to GLj may extend in a first direction D1, and the data lines DL1 to DLi may extend in a second direction D2 intersecting the first direction D1.

The display region for displaying an image of the display panel 100 may include a surrounding display area SA and a main display area MA. The main display area MA may be surrounded by the surrounding display area SA. First pixels PX1 having a first size may be disposed in the surrounding display area SA, and second pixels PX2 having a second size different from the first size may be disposed in the main display area MA. The number of pixels per unit inch (or referred to as PPI) of the surrounding display area SA may be lower than the number of pixels per unit inch of the main display area MA. For example, the PPI of the first pixels PX1 in the surrounding display area SA may be smaller than the PPI of the second pixels PX2 in the main display area MA. For example, the first pixels PX1 in the surrounding display area SA may have a first pixel density, and the second pixels PX2 in the main display area MA may have a second pixel density greater than the first pixel density of the first pixels PX1. For example, the distances between the first pixels PX1 in the surrounding display area SA may be longer than the distances between the second pixels PX2 in the main display area MA.

At least one panel driving circuit may be positioned under the surrounding display area SA. The panel driving circuit positioned under the surrounding display area SA may include the timing controller. The panel driving circuit positioned under the surrounding display area SA may include the gate driver. The panel driving circuit positioned under the surrounding display area SA may include the data driver. The panel driving circuit positioned under the surrounding display area SA may include a gamma reference voltage generator. Accordingly, the display panel according to an embodiment may provide a display area wider than a general display panel by displaying an image in the surrounding display area SA while maintaining a bezel part.

The timing controller 200 may receive input image data IMG and an input control signal CONT from an external device. For example, the input image data IMG received from the external device may include red image data, green image data, and blue image data. According to an embodiment, the input image data IMG may further include white image data. For another example, the input image data IMG may include magenta image data, yellow image data, and cyan image data. Further, the input control signal CONT may include a master clock signal, a data enable signal, a vertical sync signal, a horizontal sync signal, and the like.

The timing controller 200 may generate a first control signal CONT1, a second control signal CONT2, a third control signal CONT3, and a data signal DATA, based on the input image data IMG and the input control signal CONT.

The timing controller 200 may generate the first control signal CONT1 for controlling an operation of the gate driver 300 based on the input control signal CONT to output the first control signal CONT1 to the gate driver 300. The first control signal CONT1 may include a vertical start signal and a gate clock signal.

The timing controller 200 may generate the second control signal CONT2 for controlling an operation of the data driver 500 based on the input control signal CONT to output the second control signal CONT2 to the data driver 500. The second control signal CONT2 may include a horizontal start signal and a load signal.

The timing controller 200 may generate the data signal DATA based on the input image data IMG. The timing controller 200 may output the generated data signal DATA to the data driver 500.

The timing controller 200 may generate the third control signal CONT3 for controlling an operation of the gamma reference voltage generator 400 based on the input control signal CONT. The timing controller 200 may output the generated third control signal CONT3 to the gamma reference voltage generator 400.

The data corrector 210 may divide an input image in the form of the entire image to be displayed on the display panel in every frame into a first image to be displayed on the surrounding display area SA and a second image to be displayed on the main display area MA. In addition, the data corrector 210 may calculate a luminance deviation of the first image and determine whether the first image is displayed on the surrounding display area SA based on the luminance deviation of the first image. The arrangement of the data corrector 210 of FIG. 1 is an example according to one embodiment. The data corrector 210 may be positioned inside the timing controller so as to be a part of the timing controller, or may be positioned outside the timing controller so as to transmit or receive signals with the timing controller.

The gate driver 300 may generate gate signals, which are supplied to driving gate lines GL1 to GLj, in response to the first control signal CONT1 received from the timing controller 200. The gate driver 300 may output the generated gate signals to the gate lines GL1 to GLj. For example, the gate driver 300 may sequentially output the gate signals to the gate lines GL1 to GLj. According to an embodiment, the gate driver 300 may be mounted on a periphery of the display panel.

The gamma reference voltage generator 400 may generate a gamma reference voltage VGREF in response to the third control signal CONT3 received from the timing controller 200. The gamma reference voltage generator 400 may provide the generated gamma reference voltage VGREF to the data driver 500. The gamma reference voltage VGREF provided to the data driver 500 may have a value corresponding to each data signal DATA. According to an embodiment, the gamma reference voltage generator 400 may be disposed in the timing controller 200 or may be disposed in the data driver 500.

The data driver 500 may receive the second control signal CONT2 and the data signal DATA from the timing controller 200, and receive the gamma reference voltage VGREF from the gamma reference voltage generator 400. The data driver 500 may convert the data signal DATA having a digital format (e.g., pulse voltages) into a data voltage having an analog format (e.g., wave voltages) by using the gamma reference voltage VGREF. The data driver 500 may output the data voltage to the data lines DL1 to DLi (where i is an integer of 2 or more).

Figure 3:
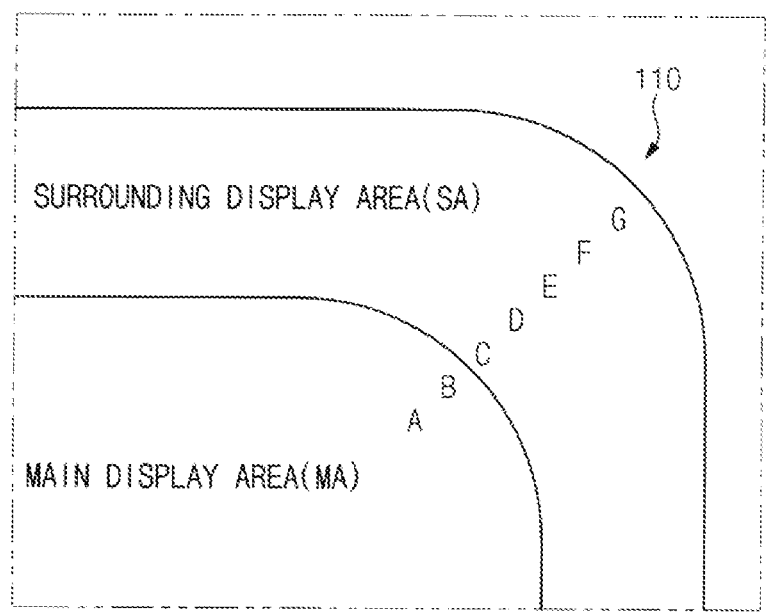
FIG. 3 is an enlarged plan view illustrating an example in which an image is displayed on a part of the display panel of FIG. 2.

FIG. 3 is an enlarged diagram illustrating an example in which an image is displayed on a part 110 of the display panel of FIG. 2.

Referring to FIGS. 2 and 3, the display unit for displaying an image of the display panel 100 may include a surrounding display area SA and a main display area MA. The main display area MA may be entirely or partially surrounded by the surrounding display area SA. According to an embodiment, the second image may be displayed on the main display area MA, and the first image may be displayed on the surrounding display area. The second image may include A and B, and the first image may include C, D, E, F, and G. However, the first image and the second image of FIG. 3 merely are examples for illustrating each display area.

At least one panel driving circuit may be positioned under the surrounding display area SA. Thus, the display panel according to an embodiment may display an image in the surrounding display area SA while maintaining the bezel part so as to provide a display area wider than a general display panel.

The second pixels PX2 having the second size may be disposed in the main display area MA. The second size may be smaller than the first size of the first pixels PX1 in the surrounding display area SA. In other words, the number of pixels per unit inch (PPI) of the main display area MA may be greater than the number of pixels per unit inch (PPI) of the surrounding display area SA. For example, the first pixels PX1 having the first size may be disposed in the surrounding display area SA. The first size may be greater than the second size of the second pixels PX2 in the main display area MA. In other words, the number of pixels per unit inch (PPI) of the surrounding display area SA may be lower than the number of pixels per unit inch (PPI) of the main display area MA. Accordingly, a luminance deviation in the surrounding display area SA may be relatively greater than that in the main display area MA. When the image is displayed in the display panel, a boundary between the surrounding display area SA and the main display area MA may be visually recognized by the user. The data corrector 210 may perform a data correction on an input image to prevent the above boundary from being visually recognized. The data corrector 210 will be described in detail with reference to FIGS. 1 and 4.

Figure 4:
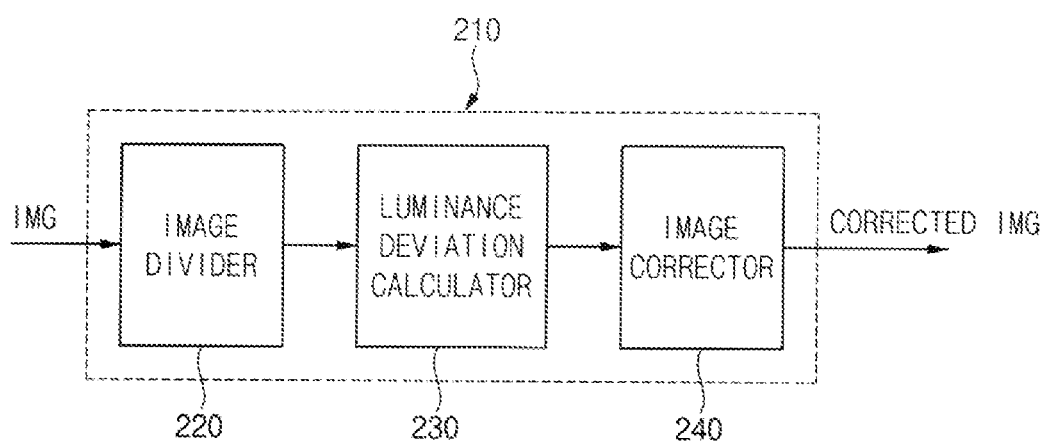
FIG. 4 is a block diagram of a data corrector included in the display device of FIG. 1.
Figure 5:
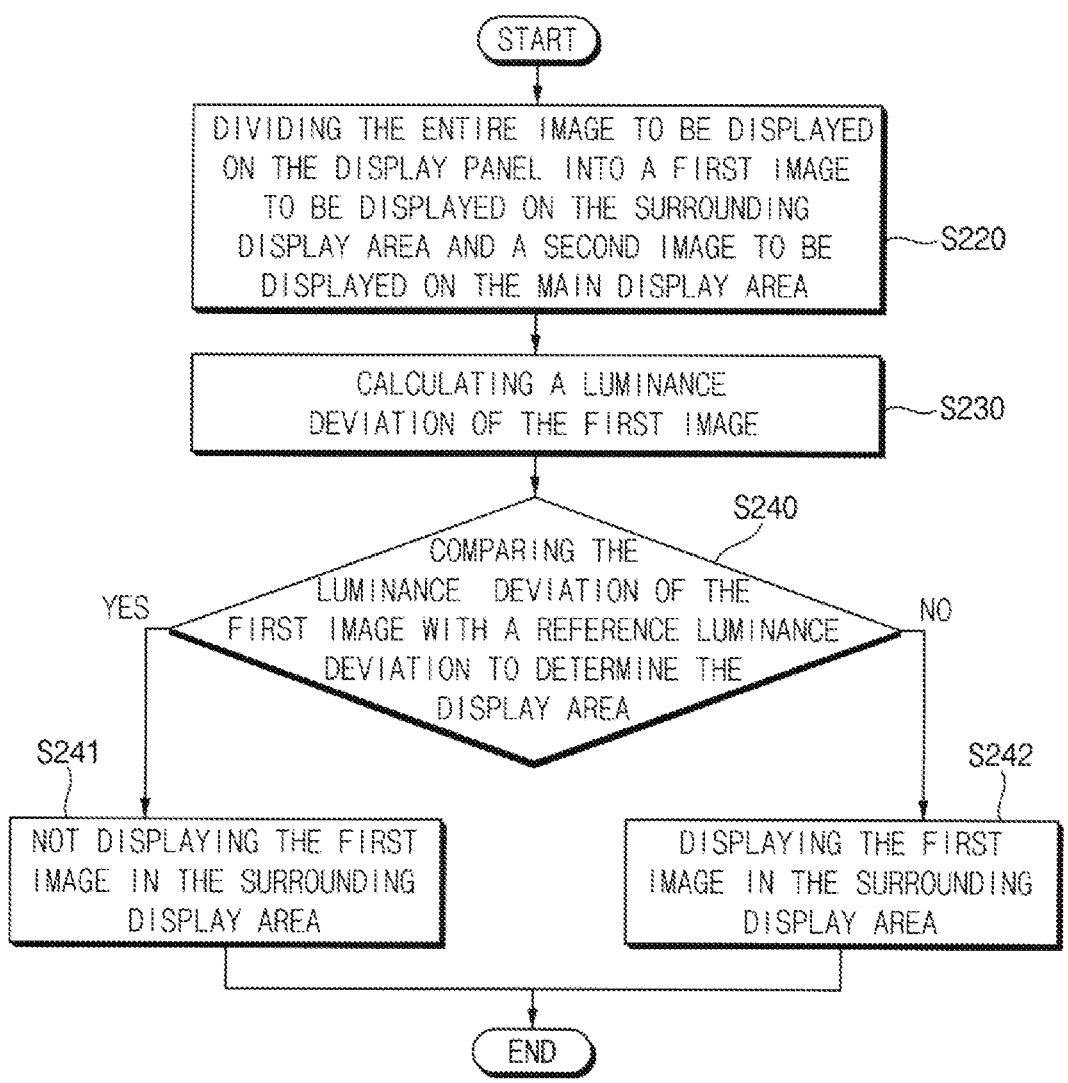
FIG. 5 is a flowchart illustrating an example in which the data corrector of FIG. 4 determines whether to display a first image in a surrounding display area.

FIG. 4 is a block diagram illustrating the data corrector 210 included in the display device of FIG. 1. FIG. 5 is a flowchart illustrating an example in which the data corrector 210 of FIG. 4 determines whether to display a first image in the surrounding display area SA.

Referring to FIGS. 1, 4 and 5, the data corrector 210 may include an image divider 220, a luminance deviation calculator 230, and an image corrector 240. The data corrector 210 may be positioned inside the timing controller so as to be a part of the timing controller, or may be positioned outside the timing controller so as to transmit or receive signals with the timing controller.

The image divider 220 may divide an input image in the form of the entire image to be displayed on the display panel into a first image to be displayed on the surrounding display area SA and a second image to be displayed on the main display area MA (S220). The luminance deviation calculator 230 may calculate a luminance deviation of the first image (S230). The image corrector 240 may compare the luminance deviation of the first image with a reference luminance deviation to determine a display area for displaying the first image (S240), and correct the input image data IMG (including the first image) such that the first image is not displayed in the surrounding display area SA (S241) or is displayed in the surrounding display area SA (S242). The above correction of the input image data IMG may be performed by every frame.

As described above, the image divider 220 may divide the entire image to be displayed on the display panel into a first image to be displayed on the surrounding display area SA and a second image to be displayed on the main display area MA (S220). The image divider 220 may determine the entire image to be displayed on the display panel as the first image to be displayed on the surrounding display area SA and the second image to be displayed on the main display area MA, based on the input image data IMG. The image divider 220 may transmit data corresponding to the first image and data corresponding to the second image to the luminance deviation calculator 230.

The luminance deviation calculator 230 may calculate a luminance deviation of the first image (S230). The luminance deviation calculator 230 may receive the data corresponding to the first image from the image divider 220. The luminance deviation calculator 230 may calculate the luminance deviation of the first image by converting the data corresponding to the first image into a corresponding gray scale value and by calculating a deviation between the lowest gray scale value of the pixels and the average gray scale value of the pixels.

Specifically, the data corresponding to the first image inputted to the luminance deviation calculator 230 may include information of the luminance (e.g., luminance data) of the first image. The luminance data of the first image may include gray scales with a predetermined unit. For example, the luminance data of the first image may have 1024, 256, or 64 gray scales. In one embodiment, the gray scale value of the first image displayed in the surrounding display area SA may be determined based on a look up table in which gray scale values are defined according to values of luminance data. In another embodiment, the gray scale value of the first image displayed in the surrounding display area SA may be determined by a gamma curve illustrating gray scale values according to values of luminance data. The luminance deviation calculator 230 may convert the luminance data of the first image into a corresponding gray scale value, based on the lookup table in which gray scale values are defined according to values of luminance data or the gamma curve illustrating gray scale values according to values of luminance data. When the luminance deviation of the first image is calculated by using the corresponding gray scale value, which is determined based on the lookup table, a more substantial luminance deviation may be calculated than when the luminance deviation is calculated by using the luminance data of the first image. For example, the luminance deviation of the first image, which is calculated based on the gray scale value corresponding to the luminance date of the first image, may be more accurate and precise than the luminance deviation of the first image, which is calculated based on the luminance date of the first image.

Specifically, the luminance deviation calculator 230 may calculate the luminance deviation of the first image by calculating a deviation between the lowest gray scale value of the first pixels PX1 arranged in the surrounding display area SA and the average gray scale value of the first pixels PX1. For example, the luminance deviation of the first image may be calculated by obtaining a difference between the average gray scale value of the first pixels PX1 and the lowest gray scale value of the first pixels PX1, dividing the difference between the gray scale values by the average gray scale value of the first pixels PX1, and multiplying by 100. In other words, the luminance deviation may be expressed as follows: the luminance deviation=((average gray scale value of first pixels−lowest gray scale value of first pixels)/(average gray scale value of first pixels))*100. The luminance deviation calculator 230 may transmit the calculated luminance deviation of the first image to the image corrector 240.

The image corrector 240 may compare (S240) the luminance deviation of the first image with a reference luminance deviation to determine a display area for displaying the first is image (i.e., to determine where the first image is displayed). For example, according to the result of the comparison between the luminance deviation of the first image and the reference luminance deviation, the image corrector 240 may correct the input image data IMG (including the first image) such that the first image is not displayed in the surrounding display area SA (S241) or is displayed in the surrounding display area SA (S242).

For example, the reference luminance deviation used as a criterion for determining the luminance deviation of the first image may be stored in an internal memory of the image corrector 240. When the luminance deviation of the first image is greater than the reference luminance deviation, a boundary between the surrounding display area SA and the main display area MA may be visually recognized by the user. The reference luminance deviation may be a value inputted by the user. The reference luminance deviation may have different values according to the input image data IMG. The reference luminance deviation may have different values according to the number of pixels per unit inch (PPI) of the surrounding display area SA. The image corrector 240 may compare the luminance deviation of the first image calculated by the luminance deviation calculator 230 with the reference luminance deviation.

Specifically, the image corrector 240 may determine whether the first image is displayed in the surrounding display area SA based on the luminance deviation of the first image, and correct the input image data IMG (e.g., the first image) to generate corrected image data IMG' (e.g., the corrected first image). For example, when the luminance deviation of the first image is greater than the reference luminance deviation, the image corrector 240 may correct the input image data IMG corresponding to the entire image to prevent the first image from being displayed in the surrounding display area SA. When the luminance deviation of the first image is less than or equal to the reference luminance deviation, the image corrector 240 may correct the input image data IMG corresponding to the entire image, so that the first image is displayed in the surrounding display area SA.

Figure 6:
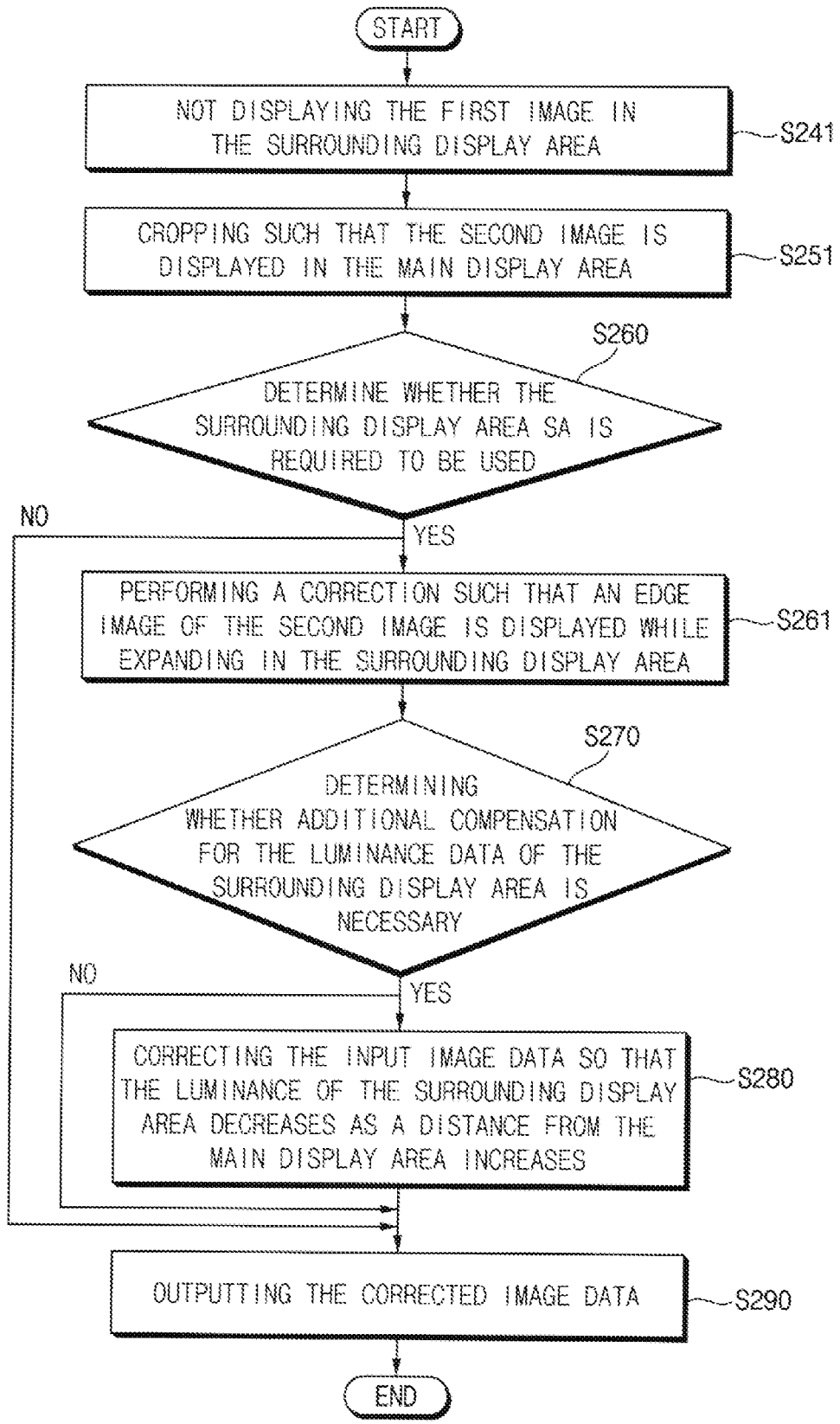
FIG. 6 is a diagram illustrating an example in which the data corrector of FIG. 4 performs a cropping operation with respect to an entire image.
Figure 7:
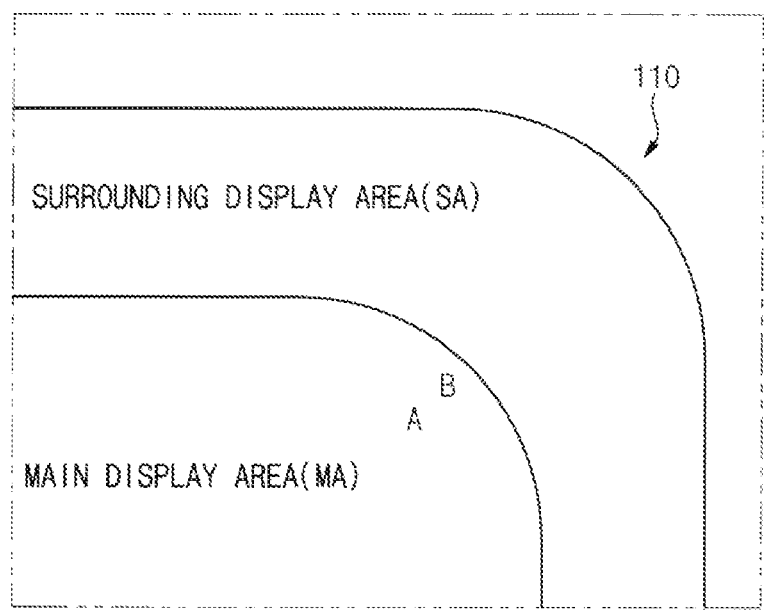
FIG. 7 is an enlarged diagram illustrating an example in which the data corrector of FIG. 4 performs a cropping operation with respect to an entire image.

FIG. 6 is a diagram illustrating an example in which the data corrector 210 of FIG. 4 performs a cropping operation with respect to the entire image. FIG. 7 is an enlarged diagram illustrating an example in which the data corrector 210 of FIG. 4 performs a cropping operation with respect to the entire image.

Referring to FIGS. 3, 4, 5, 6, and 7, when the luminance deviation of the first image is greater than the reference luminance deviation, the image corrector 240 may perform the correction operation on the first image such that the first image is not displayed in the surrounding display area SA (S241). The image corrector 240 may perform a cropping operation such that the second image is displayed in the main display area MA (S251). The image corrector 240 may determine whether the surrounding display area SA is required to be used (S260). The image corrector 240 may perform a correction such that an edge image of the second image is displayed while expanding in the surrounding display area SA (S261). The image corrector 240 may determine whether additional compensation for the luminance data of the second image, which is displayed in the surrounding display area SA, is necessary (S270). The image corrector 240 may correct the input image data IMG, so that the luminance of the surrounding display area SA decreases as a distance from the main display area MA increases (S280). The image corrector 240 may output the corrected image data IMG' (S290).

When the luminance deviation of the first image is greater than the reference luminance deviation, the image corrector 240 may perform the correction of the input image data IMG (including the first image) such that the first image is not displayed in the surrounding display area SA (S241). In other words, the image corrector 240 may correct the input image data IMG corresponding to the entire image such that the first image is not displayed in the surrounding display area SA. The image corrector 240 may perform the cropping operation such that the second image is displayed in the main display area MA (S251). As a result, the image corrector 240 may crop the entire image by correcting the input image data IMG corresponding to the entire image. For example, referring to the part 110 of the display panel of FIG. 3, the second image of the entire image according to the input image data IMG may display A and B, and the first image may display C, D, E, F, and G. When the image corrector 240 crops the input image data IMG, the second image (e.g., A, B) is displayed in the main display area MA, but the first image (e.g., C, D, E, F, and G) may not be displayed in the surrounding display area SA as shown in FIG. 7.

The image corrector 240 may determine whether the surrounding display area SA is required to be used (S260). When the surrounding display area SA is used, there may be an effect of providing a wider display image to the user compared to the case that only the main display area MA is used. The image corrector 240 may determine whether the surrounding display area SA is necessary to be used, based on the number of pixels per unit inch (PPI) of the first pixels PX1 and the luminance deviation of the image to be displayed. According to an embodiment, the necessity of using the surrounding display area SA may be determined according to a selection by the user. When the surrounding display area SA is necessary to be used, the image corrector 240 may perform a correction of input image data (including the second image) such that an edge image of the second image is displayed while expanding in the surrounding display area SA (S261). Specifically, an edge image of the second image displayed in the main display area MA is copied and repeatedly displayed in the surrounding display area SA. Accordingly, a wide display image may be provided to a user while the possibility of visual recognition of the luminance deviation is minimized or prevented.

The image corrector 240 may determine whether additional compensation for the luminance data of an image (e.g., the first or second image), which is displayed in the surrounding display area SA, is necessary (S270). When the edge image of the second image is expanded and displayed in the surrounding display area SA, the luminance deviation may occur in an image displayed in the surrounding display area SA. In order to improve the above luminance deviation, the image corrector 240 may determine whether additional compensation for the luminance data of an image (e.g., the first or second image), which is displayed in the surrounding display area SA, is necessary. The image corrector 240 may correct the input image data IMG so that the luminance of the surrounding display area SA decreases as a distance from the main display area MA increases so as to additionally compensate for the luminance data of an image (e.g., the first or second image), which is displayed in the surrounding display area SA (S280). Specifically, the image corrector 240 may divide the surrounding display area SA into first to k-th sub-surrounding display areas SA (where k is an integer of 2 or more). The first sub-surrounding display area SA may be adjacent to the main display area MA, and the k-th sub-surrounding display area SA may be adjacent to an edge area of the surrounding display area SA. The sub-surrounding display areas SA may be disposed at the same interval. The image corrector 240 may correct the second image such that a luminance of the edge image of the second image displayed in the m-th sub-surrounding display area SA is greater than a luminance of the edge image of the second image displayed in the (m+1)-th sub-surrounding display area SA (where, m is an integer more than or equal to 1 and less than k). The image corrector 240 may output the above corrected image data IMG' (S290). In other words, the image of the surrounding display area SA may have a gradation effect while the luminance decreasing as the edge images of the second image are farther from the main display area MA. Accordingly, the user may not visually recognize the luminance deviation of the display image while watching the display image in a wide area.

Figure 8:
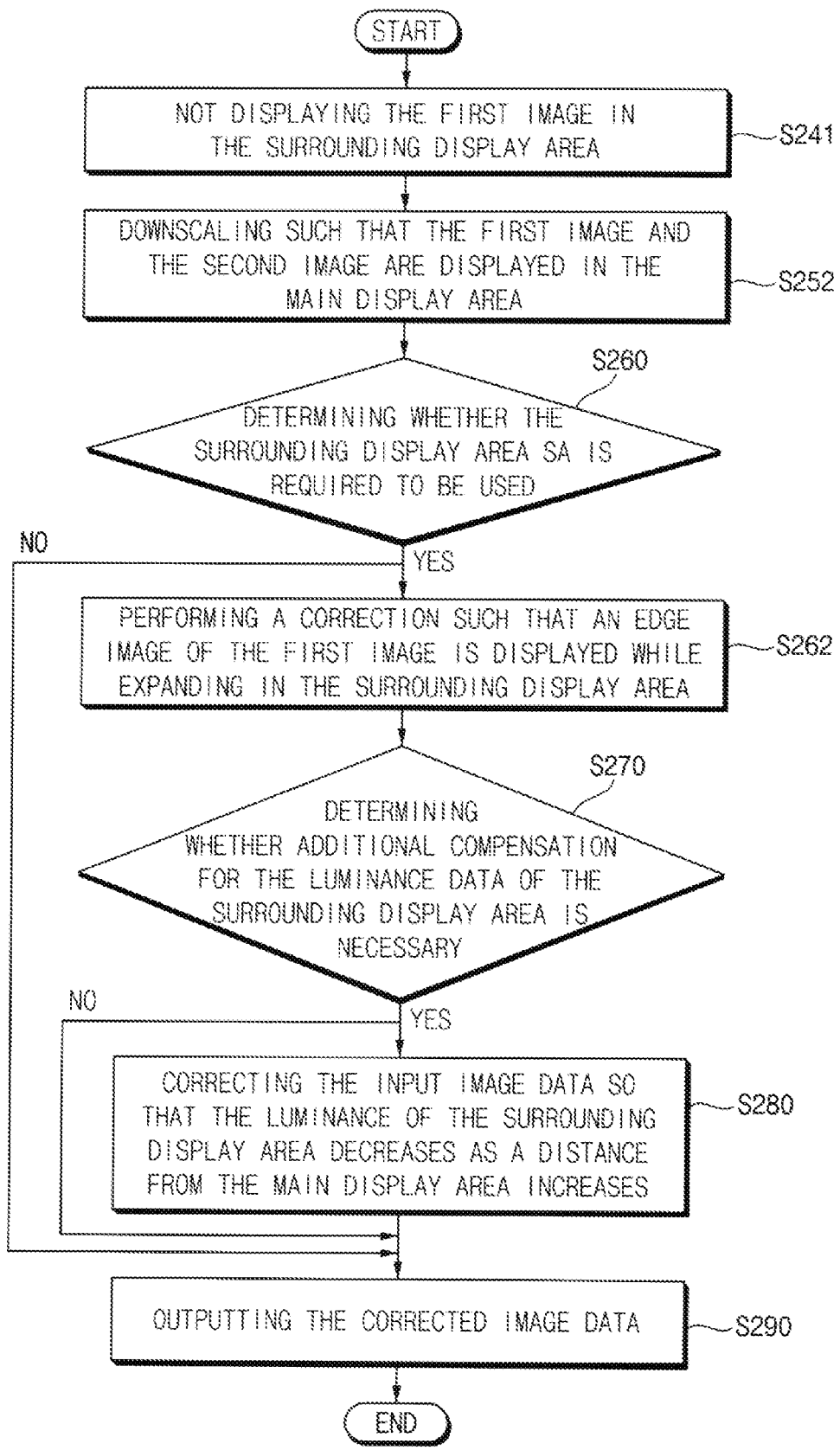
FIG. 8 is a diagram illustrating an example in which the data corrector of FIG. 4 performs a downscaling operation with respect to an entire image.
Figure 9:
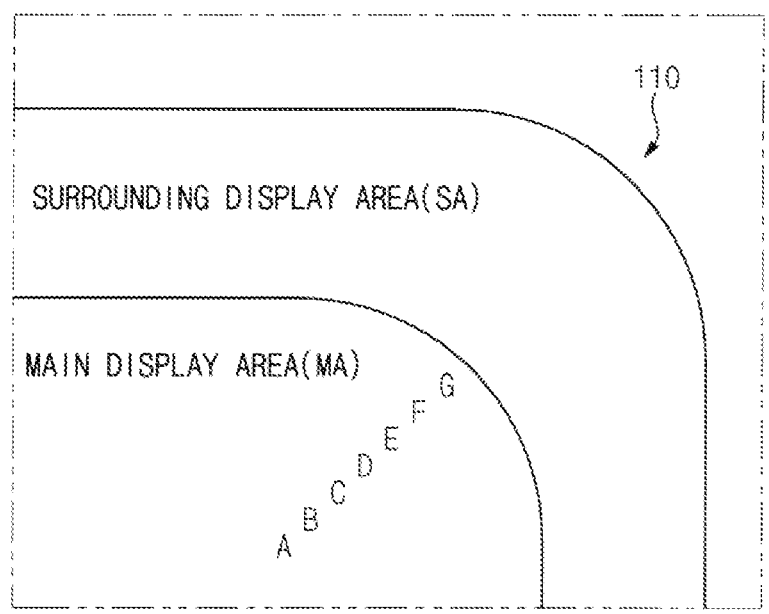
FIG. 9 is an enlarged diagram illustrating an example in which the data corrector of FIG. 4 performs a downscaling operation with respect to an entire image.

FIG. 8 is a diagram illustrating an example in which the data corrector 210 of FIG. 4 performs a downscaling operation with respect to the entire image. FIG. 9 is an enlarged diagram illustrating an example in which the data corrector 210 of FIG. 4 performs the downscaling operation with respect to the entire image.

Referring to FIGS. 3, 4, 5, 8, and 9, when the luminance deviation of the first image is greater than the reference luminance deviation, the image corrector 240 may perform the correction such that the first image is not displayed in the surrounding display area SA (S241). The image corrector 240 may perform the downscaling operation such that the first image and the second image are displayed in the main display area MA (S252). The image corrector 240 may determine whether the surrounding display area SA is required to be used (S260). The image corrector 240 may perform a correction of input image data IMG (including the first image) such that an edge image of the first image is displayed while expanding in the surrounding display area SA (S262). The image corrector 240 may determine whether additional compensation for the luminance data of an image (e.g., the first or second image), which is displayed in the surrounding display area SA, is necessary (S270). The image corrector 240 may correct the input image data IMG so that the luminance of the surrounding display area SA decreases as a distance from the main display area MA increases (S280). The image corrector 240 may output the corrected image data IMG' (S290).

When the luminance deviation of the first image is greater than the reference luminance deviation, the image corrector 240 may perform the correction of input image data IMG (including the first image) such that the first image is not displayed in the surrounding display area SA (S241). In other words, the image corrector 240 may correct the input image data IMG corresponding to the entire image such that the first image is not displayed in the surrounding display area SA. The image corrector 240 may perform the downscaling operation such that the first image and the second image are displayed in the main display area MA. As a result, the image corrector 240 may downscale the entire image by correcting the input image data IMG corresponding to the entire image. For example, referring to the part 110 of the display panel of FIG. 3, the second image of the entire image according to the input image data IMG may display A and B, and the first image may display C, D, E, F, and G. When the image corrector 240 downscales the input image data IMG, the second image (e.g., A and B) and the first image (e.g., C, D, E, F, and G) may be displayed in the main display area MA as shown in FIG. 9.

The image corrector 240 may determine whether the surrounding display area SA is required to be used (S260). When the surrounding display area SA is used, there may be an advantage of providing a wider display image to the user compared to the case that only the main display area MA is used. The image corrector 240 may determine whether the surrounding display area SA is necessary to be used, based on the number of pixels per unit inch (PPI) of the first pixels PX1 and the luminance deviation of the image to be displayed. According to an embodiment, the necessity of using the surrounding display area SA may be determined according to a selection by the user. When the surrounding display area SA is necessary to be used, the image corrector 240 may perform a correction of input image data (including the first image) such that an edge image of the first image is displayed while expanding in the surrounding display area SA (S262). Specifically, an edge image of the first image displayed in the main display area MA is copied and repeatedly displayed in the surrounding display area SA. Accordingly, a wide display image may be provided to a user while the possibility of visual recognition of the luminance deviation is minimized or prevented.

The image corrector 240 may determine whether additional compensation for the luminance data of an image (e.g., the first or second image), which is displayed in the surrounding display area SA, is necessary (S270). When the edge image of the first image is expanded and displayed in the surrounding display area SA, the luminance deviation may occur in an image displayed in the surrounding display area SA. In order to improve the above luminance deviation, the image corrector 240 may determine whether additional compensation for the luminance data of an image (e.g., the first or second image), which is displayed in the surrounding display area SA, is necessary. The image corrector 240 may correct the input image data IMG so that the luminance of the surrounding display area SA decreases as a distance from the main display area MA increases so as to additionally compensate for the luminance data of an image (e.g., the first or second image), which is displayed in the surrounding display area SA (S280). Specifically, the image corrector 240 may divide the surrounding display area SA into first to k-th sub-surrounding display areas SA (where k is an integer of 2 or more). The first sub-surrounding display area SA may be adjacent to the main display area MA, and the k-th sub-surrounding display area SA may be adjacent to an edge area of the surrounding display area SA. The sub-surrounding display areas SA may be disposed at the same interval. The image corrector 240 may correct the second image such that a luminance of the edge image of the first image displayed in the m-th sub-surrounding display area SA is greater than a luminance of the edge image of the first image displayed in the (m+1)-th sub-surrounding display area SA (where, m is an integer more than or equal to 1 and less than k). The image corrector 240 may output the above corrected image data IMG' (S290). In other words, the image of the surrounding display area SA may have a gradation effect while the luminance decreasing as the edge images of the first image are farther from the main display area MA. Accordingly, the user may not visually recognize the luminance deviation of the display image while watching the display image in a wide area.

Figure 10:
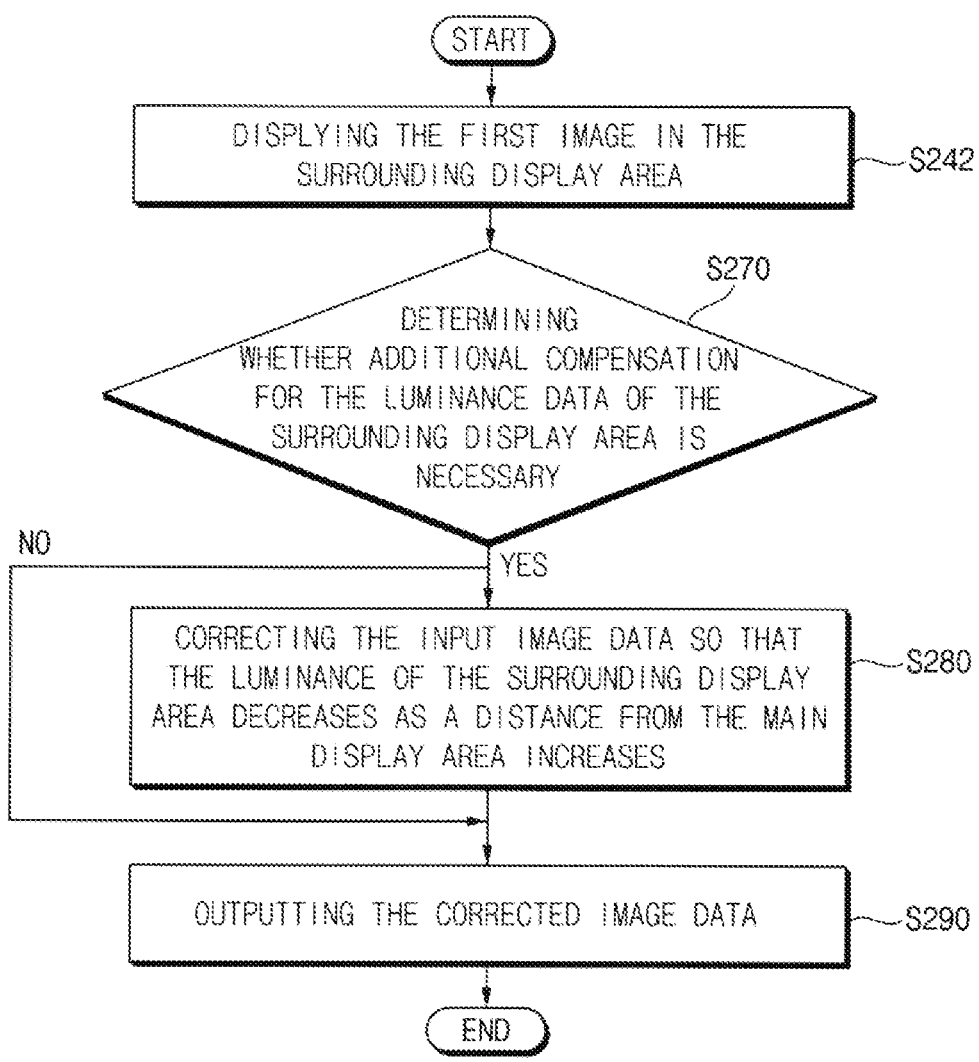
FIG. 10 is a flowchart illustrating an example in which the data corrector of FIG. 4 displays a first image in the surrounding display area.

FIG. 10 is a flowchart illustrating an example in which the data corrector 210 of FIG. 4 displays the first image in the surrounding display area SA.

Referring to FIGS. 3, 4, 5 and 10, when the luminance deviation of the first image is smaller than the reference luminance deviation, the image corrector 240 may perform the correction such that the first image is displayed in the surrounding display area SA (S242). The image corrector 240 may determine whether additional compensation for the luminance data of an image (e.g., the first or second image), which is displayed in the surrounding display area SA, is necessary (S270). The image corrector 240 may correct the input image data IMG so that the luminance of the surrounding display area SA decreases as a distance from the main display area MA increases (S280). The image corrector 240 may output the corrected image data IMG' (S290).

When the luminance deviation of the first image is smaller than the reference luminance deviation, the image corrector 240 may perform the correction such that the first image is displayed in the surrounding display area SA (S242). In other words, the image corrector 240 may divide the input image data IMG corresponding to the entire image into the first image and the second image, and output image data such that the first image is displayed in the surrounding display area SA and the second image is displayed in the main display area MA. In other words, when the luminance deviation of the first image is smaller than the reference luminance deviation, since it is difficult for the user to recognize the luminance deviation of the surrounding display area SA, the first image may be displayed in the surrounding display area SA. The image corrector 240 may correct the input image data IMG to prevent the boundary between the surrounding display area SA and the main display area MA from being visually recognized by the user.

For example, the image corrector 240 may determine whether additional compensation for the luminance data of an image (e.g., the first or second image), which is displayed in the surrounding display area SA, is necessary (S270). The luminance deviation of the first image also may occur in the surrounding display area SA when the luminance deviation of the first image is smaller than the reference luminance deviation. In order to improve the above luminance deviation, the image corrector 240 may determine whether additional compensation for the luminance data of an image (e.g., the first or second image), which is displayed in the surrounding display area SA, is necessary. The image corrector 240 may correct the input image data IMG so that the luminance of the surrounding display area SA decreases as a distance from the main display area MA increases (S280). Specifically, the image corrector 240 may divide the surrounding display area SA into first to k-th sub-surrounding display areas SA (where k is an integer of 2 or more), and divide the first image into a plurality of sub-first images corresponding to a plurality of sub-surrounding display areas SA, respectively. The first sub-surrounding display area SA may be adjacent to the main display area MA, and the k-th sub-surrounding display area SA may be adjacent to an edge area of the surrounding display area SA. The sub-surrounding display areas SA may be disposed at the same interval. The image corrector 240 may perform the correction such that the luminance of the image displayed in the m-th sub-surrounding display area SA is greater than the luminance of the image displayed in the (m+1)-th sub-surrounding display area SA (where, m is an integer more than or equal to 1 and less than k). The image corrector 240 may output the above corrected image data IMG' (S290). In other words, the surrounding display area SA may have a gradation effect while the luminance decreasing as the first image is farther from the main display area MA. Accordingly, the user may not feel the luminance deviation of the display image while watching the display image in a wide area.

The display device including the data corrector 210 as described above may provide the user with a wide display area by displaying an image on a bezel of the display panel. In addition, the display device according to an embodiment may provide the user with an image having high quality by preventing the boundary between the surrounding display area SA and the main display area MA from being visibly recognized by the user.

Figure 11:
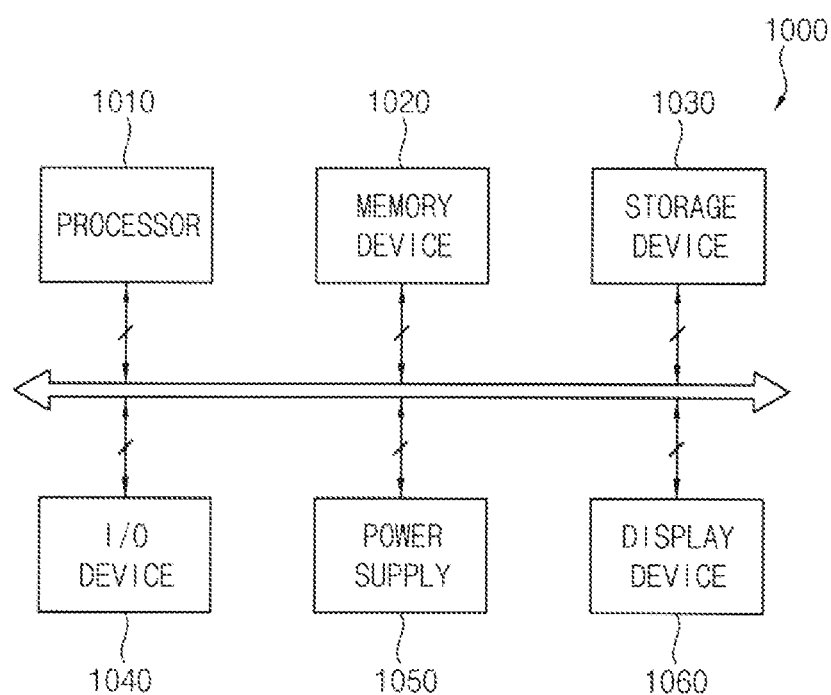
FIG. 11 is a block diagram of an embodiment of an electronic device with the display device of FIG. 1 constructed according to the principles of the invention.
Figure 12:
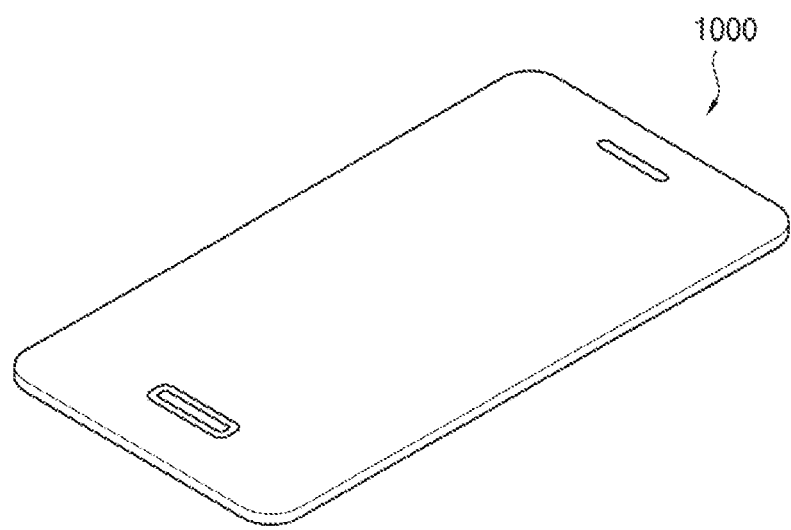
FIG. 12 is a perspective view of an embodiment of a phone with the display device of FIG. 1 constructed according to the principles of the invention.

FIG. 11 is a block diagram illustrating an electronic device according to an embodiments. FIG. 12 is a diagram illustrating an example in which the electronic device of FIG. 11 is implemented as a smart phone.

Referring to FIGS. 11 and 12, the electronic device 1000 may include a processor 1010, a memory device 1020, a storage device 1030, an input/output (I/O) device 1040, a power supply 1050, and a display device 1060. Here, the display device 1060 may be the display device 10 of FIG. 1. In addition, the electronic device 1000 may further include a plurality of ports for communicating with a video card, a sound card, a memory card, a universal serial bus (USB) device, other electronic device, and the like. In an embodiment, as illustrated in FIG. 12, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus. The memory device 1020 may store data for operations of the electronic device 1000. For example, the memory device 1020 may include at is least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like. The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060. The power supply 1050 may provide power for operations of the electronic device 1000.

The display device 1060 may display an image corresponding to visual information of the electronic device 1000. The display device 1060 may include a display panel disposed with first pixels PX1 having a first size or a first pixel density, and including a surrounding display area below which at least one panel driving circuit is positioned, and a main display area surrounded by the surrounding display area and disposed therein with second pixels PX2 having a second size smaller than the first size or a second pixel density greater than the first pixel density and a display panel driver for driving the display panel and configured to divide an entire image to be displayed on the display panel in every frame into a first image to be displayed on the surrounding display area and a second image to be displayed on the main display area, calculate a luminance deviation of the first image, and determine whether to display the first image in the surrounding display area based on the luminance deviation of the first image. The display device including the data corrector as described above may provide the user with a wide display area by displaying an image on a bezel of the display panel. In addition, the display device according to an embodiment may provide the user with an image having high quality by preventing the boundary between the surrounding display area and the main display area from being visibly recognized. However, since these are described above, duplicated description related thereto will not be repeated.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel comprising a surrounding display area, below which at least one panel driving circuit is positioned, and a main display area surrounded by the surrounding display area, the display panel comprising first pixels having a first pixel density and disposed in the surrounding display area and second pixels having a second pixel density greater than the first pixel density and disposed in the main display area; and
a display panel driver configured to divide an input image to be displayed on the display panel in each frame into a first image to be displayed on the surrounding display area and a second image to be displayed on the main display area, calculate a luminance deviation of the first image, and determine whether to display the first image in the surrounding display area based on the luminance deviation of the first image.

2. The display device of claim 1, wherein the display panel driver comprises a data corrector for downscaling or cropping the input image by correcting input image data corresponding to the input image based on the luminance deviation of the first image.

3. The display device of claim 2, wherein the data corrector is configured to correct the input image data such that the first image is not displayed in the surrounding display area and the second image is displayed in the main display area when the luminance deviation of the first image is greater than a reference luminance deviation.

4. The display device of claim 2, wherein the data corrector is configured to correct the input image data such that the second image is displayed in the main display area and an edge image of the second image is expanded and displayed in the surrounding display area when the luminance deviation of the first image is greater than a reference luminance deviation.

5. The display device of claim 4, wherein the data corrector is configured to additionally correct the input image data such that a luminance of the surrounding display area is decreased as a distance from the main display area is increased when the edge image of the second image is expanded and displayed in the surrounding display area.

6. The display device of claim 2, wherein the data corrector is configured to correct the input image data such that the first image is not displayed in the surrounding display area and the first image and the second image are displayed in the main display area when the luminance deviation of the first image is greater than a reference luminance deviation.

7. The display device of claim 2, wherein the data corrector is configured to correct the input image data such that the first image and the second image are displayed in the main display area and an edge image of the first image is expanded and displayed in the surrounding display area when the luminance deviation of the first image is greater than a reference luminance deviation.

8. The display device of claim 7, wherein the data corrector is configured to additionally correct the input image data such that a luminance of the surrounding display area is decreased as a distance from the main display area is increased when the edge image of the first image is expanded and displayed in the surrounding display area.

9. The display device of claim 2, wherein the data corrector is configured to correct the input image data such that the first image is displayed in the surrounding display area, the second image is displayed in the main display area, and a boundary between the surrounding display area and the main display area is prevented from being visually recognized to a user when the luminance deviation of the first image is smaller than a reference luminance deviation.

10. The display device of claim 9, wherein the data corrector is configured to additionally correct the input image data such that a luminance of the surrounding display area is decreased as a distance from the main display area is increased when the first image is displayed in the surrounding display area.

11. A method of operating a display panel having a main display area and a surrounding display area surrounding the main display area, the method comprising the steps of:
   driving the display panel and dividing an input image to be displayed on the display panel in each frame into a first image to be displayed in the surrounding display area and a second image to be displayed in the main display area;
   calculating a luminance deviation of the first image; and
   determining whether to display the first image in the surrounding display area based on the luminance deviation of the first image, wherein the display panel comprises at least one panel driving circuit disposed under the surrounding display area, first pixels having a first pixel density and disposed in the surrounding display area, and second pixels having a second pixel density greater than the first pixel density and disposed in the main display area.

12. The method of claim 11, further comprising the step of:
   downscaling or cropping the input image by correcting input image data corresponding to the input image based on the luminance deviation of the first image.

13. The method of claim 12, wherein the step of cropping of the input image comprises the step of correcting the input image data such that the first image is not displayed in the surrounding display area and the second image is displayed in the main display area when the luminance deviation of the first image is greater than a reference luminance deviation.

14. The method of claim 12, wherein the step of cropping of the input image comprises the step of correcting the input image data such that the second image is displayed in the main display area and an edge image of the second image is expanded and displayed in the surrounding display area when the luminance deviation of the first image is greater than a reference luminance deviation.

15. The method of claim 14, wherein the step of cropping of the input image further comprises the step of correcting the input image data such that a luminance of the surrounding display area is decreased as a distance from the main display area is increased when the edge image of the second image is expanded and displayed in the surrounding display area.

16. The method of claim 12, wherein the step of downscaling of the input image comprises the step of correcting the input image data such that the first image is not displayed in the surrounding display area and the first image and the second image are displayed in the main display area when the luminance deviation of the first image is greater than a reference luminance deviation.

17. The method of claim 12, wherein the step of downscaling of the input image comprises the step of correcting the input image data such that the first image and the second image are displayed in the main display area and an edge image of the first image is expanded and displayed in the surrounding display area when the luminance deviation of the first image is greater than a reference luminance deviation.

18. The method of claim 17, wherein the step of downscaling of the input image further comprises the step of correcting the input image data such that a luminance of the surrounding display area is decreased as a distance from the main display area is increased when the edge image of the first image is expanded and displayed in the surrounding display area.

19. The method of claim 12, wherein the step of correcting of the input image data comprises the step of correcting the input image data such that the first image is displayed in the surrounding display area, the second image is displayed in the main display area, and a boundary between the surrounding display area and the main display area is prevented from being visually recognized to a user when the luminance deviation of the first image is smaller than a reference luminance deviation.

20. The method of claim 19, wherein the step of correcting of the input image data further comprises the step of correcting the input image data such that a luminance of the surrounding display area is decreased as a distance from the main display area is increased when the first image is displayed in the surrounding display area.

21. A display device comprising:
   a display panel comprising a surrounding display area, below which at least one panel driving circuit is positioned, and a main display area surrounded by the surrounding display area, the display panel comprising first pixels having a first size and disposed in the surrounding display area and second pixels having a second size smaller than the first size and disposed in the main display area; and a display panel driver configured to divide an input image to be displayed on the display panel in each frame into a first image to be displayed on the surrounding display area and a second image to be displayed on the main display area, calculate a luminance deviation of the first image, and determine whether to display the first image in the surrounding display area based on the luminance deviation of the first image.

22. A method of operating a display panel having a main display area and a surrounding display area surrounding the main display area, the method comprising the steps of:

driving the display panel and dividing an input image to be displayed on the display panel in each frame into a first image to be displayed in the surrounding display area and a second image to be displayed in the main display area;

calculating a luminance deviation of the first image; and determining whether to display the first image in the surrounding display area based on the luminance deviation of the first image, wherein the display panel comprises at least one panel driving circuit disposed under the surrounding display area, first pixels having a first size and disposed in the surrounding display area, and second pixels having a second size smaller than the first size and disposed in the main display area.

* * * * *